United States Patent [19]
Rawson

[11] 4,422,562
[45] Dec. 27, 1983

[54] GROUND CONTROL SYSTEM

[75] Inventor: James L. Rawson, Oelwein, Iowa

[73] Assignee: Rawson Control Systems, Inc., Oelwein, Iowa

[21] Appl. No.: 266,083

[22] Filed: May 21, 1981

[51] Int. Cl.$^3$ ............................................. A01C 15/18
[52] U.S. Cl. ..................................... 222/55; 222/625
[58] Field of Search .................. 222/52, 55, 623, 624, 222/625; 239/650; 318/341

[56] References Cited

U.S. PATENT DOCUMENTS

| | | | |
|---|---|---|---|
| 3,668,560 | 6/1972 | Padalino et al. | 318/341 X |
| 3,677,540 | 7/1972 | Weiss | 222/624 X |
| 3,679,098 | 7/1972 | Weiss | 222/624 X |
| 3,700,987 | 10/1972 | Deering | 318/341 X |
| 4,277,022 | 7/1981 | Holdsworth et al. | 222/55 X |

*Primary Examiner*—Stanley H. Tollberg
*Attorney, Agent, or Firm*—Hugh D. Jaeger

[57] ABSTRACT

Ground control system for use with a spreader of dry bulk material at a predetermined rate and speed. The spreader mounts on a vehicle or like structure. The ground control system has input variables of travel rate of the vehicle and conveyor rate of the conveyor running through the spreader, and an output signal for controlling height of a feedgate movable at an exit port of the spreader. The travel rate input signal includes sensing the speed of the vehicle and accounts for calibration signals dependent on vehicle components such as tire sizes and other constants, and includes variable inputs such as the swath width and the application rate of spreading. The conveyor speed input signal includes the speed of the conveyor, predetermined constants such as conveyor width, gear ratio, etc., and input variables including the density of the material and the weight of the material. The input signals are differentiated for controlling the servo coupled to the feedgate. A feedback signal from the feedgate connects to the conveyor input circuit. The servo control signal to the feedgate can be pulse modulated for optimum control of the opening and closing speed of the feedgate. The pulse rate of the pulse modulation can also be adjustable. The system provides for the saving of energy.

2 Claims, 2 Drawing Figures

GROUND CONTROL SYSTEM

BACKGROUND OF THE INVENTION

1. Field of the Invention

The present invention relates to a vehicle control system and, more particularly, pertains to a ground control system for agricultural or like use. The present invention can also pertain to spreaders for agricultural use, other materials, or ordinary road salt.

2. Background of the Invention

In the application of dry bulk material to the ground for purposes of fertilizing, weed control and soil conditioning or ice control, the most prevalent method of application has been to maintain a preselected ratio of metering conveyor speed of a spreader to travel speed of the vehicle. In the 1960's, the common method was to mechanically connect the conveyor drive to a member of the vehicle propulsion system such as the transmission or geared to the wheel. This method provided that any increase in travel speed produced a proportional increase in metering conveyor speed but with the two disadvantages being the high cost of maintenance of mechanical drives for transmitting the prime moving torque and the inability to speedily change the ratio of metering conveyor speed to travel speed of the vehicle.

The above problems were overcome by converting to hydraulic drive control, as illustrated in U.S. Pat. No. 3,441,039, which proved successful with the exception that the hydraulic drive control was highly wasteful of energy through consumption of power for the control and limited throughput of materials.

The energy consumption problem was overcome by U.S. Pat. No. 3,703,810 which reduced energy consumption and expanded the throughput limitations, but the hydraulic bypass flow control problem was still prevalent with energy being over utilized. With the rapidly increasing cost of energy, the system was not energy-efficient.

The present invention overcomes the disadvantages of the prior art by providing a ground control system which exhibit maximum efficiency of energy utilization and, more importantly, adjusts the height of the feedgate dependent on the conveyor speed of the spreader and the ground speed of the vehicle. The system provides for the saving of energy.

SUMMARY OF THE INVENTION

The general purpose of the present invention is a ground control system which is energy-efficient and enhances ease of operation. The ground control system controls the height of the feedgate on a spreader and is dependent on variable inputs of ground speed of the vehicle and conveyor speed of the spreader, and provides for inputting of predetermined constants such as the area to be spread, the weight to be spread per the area, the swath width, density of the material and size of the vehicle as well as conveyor constants such as drive train, constants of the vehicle and dimensional width constants of the conveyor structure. The ground control system can be easily operated by an operator and does not require any mathematical computations, but only dialing in the predetermined constants assuring that any individual with minimum operational skills can operate the system.

According to one embodiment of the present invention, there is provided a ground control system for controlling the opening of a metering feedgate of a spreader affixed to a vehicle with respect to the ground travel speed of the vehicle and the speed of the conveyor, the ground control system including a sensor for sensing travel speed of the vehicle, input constants signal amplifier for ratioing the vehicle component structure and connected to an amplifier for the sensor, an input constants signal amplifier for selecting the swath width and connected to the ratio amplifier, a sensor for sensing the speed of the conveyor longitudinally running the length of the conveyor, input constants signal amplifier for ratioing the width of the conveyor and connected to an amplifier for the conveyor sensor, input constants signal amplifier for selecting the density of the material and connected to the ratio amplifier, an amplifier for ratioing the signal from the density of material amplifier, differential amplifier for differentiating the vehicle travel speed signal from the swath width amplifier and the conveyor speed signal from the ratio amplifier, a servo control connected to the output of the differential amplifier for adjusting the height of a feedgate covering the opening of an exit port in the spreader and directly above the exit of the conveyor, the servo control controlling the height of the feedgate directly responsive to the output of the differential amplifier, a feedgate height potentiometer connected to the feedgate and the feedback signal connected to the input of the ratio amplifier in the conveyor speed signal circuit. The signal to the control servo can be pulse modulated with an adjustable pulse rate providing variable speed control of the feedgate dependent on the length of the pulse through the pulse amplifier which connects between the output of the differential amplifier and the input of the servo control.

A significant aspect and feature of the present invention is a ground control system which is easily adaptable to any vehicle physically, structurally, and electronically. The variable input parameters are electronically inputted providing for maximum ease of adjustment by dialing in the input parameter such as on BCD switches or on multiple-position switches or variable potentiometers. By presetting constants such as swath width, application rate, material density and spreading density, an operator of the ground control system can merely drive the vehicle and the servo controlled feedgate will automatically open and close above an exit at the end of the conveyor, providing for a regulated discharge of material. The material can be either fertilizer, salt, or like material.

Another significant aspect and feature of the present invention is a ground control system which can be utilized by an operator with minimal training for utilization of the system. The operator only needs to know the constant settings for the material, the conveyor, the vehicle, and the application and swath rate, and appropriately set these adjustments prior to spreading of the material. Some of these predetermined constants such as conveyor width and vehicle constants such as tire speed, gearing ratio, etc. can be predetermined and set either at the factory or at the mechanical shop prior to sending an operator out with the equipment. The only basic operator requirements with this type of system is that the operator is able to drive the vehicle, read and correlate the mathematical constants if required and, most importantly, dial in the constants on the switches or potentiometer prior to driving the vehicle away to start the spreading process of material.

Another significant aspect and feature of the present invention is a ground control system which provides maximum energy efficiency between the vehicle, conveyor of the spreader, and spreading of material, but also provides maximum efficiency in spreading of the predetermined amount of material whether the material be fertilizer, weed control material or salt. This is particularly important for fertilizer, as most fertilizers are petrol-based chemicals which continue to rise in price on a yearly basis.

A further significant aspect and feature of the present invention is a ground control system which includes a servo controlled feedgate and which is controlled by differentiated signals of the travel speed of the vehicle and the speed of the conveyor of the spreader. The opening is dependent upon the speed and other predetermined constants inputted into the vehicle travel speed circuit and the conveyor speed circuit prior to being differentiated by a differential amplifier. A feedback loop connects from the feedgate back to the conveyor speed circuit although it could just as well connect into the vehicle travel speed circuit and provides for further feedback control and operation of the servo control feedgate. The feedback loop provides precise and precision control of the feedgate in maximum efficiency and least use of energy in dispensing of material from the system. The speed of the feedgate movement is pulse modulated for optimum speed control dependent upon the width of the pulse.

Having thus described embodiments of the present invention, it is a principal object hereof to provide a ground control system having a feedback controlled feedgate as a function of vehicle travel, ground speed and conveyor speed of a spreader which dispenses material such as fertilizer, salt, or like material.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
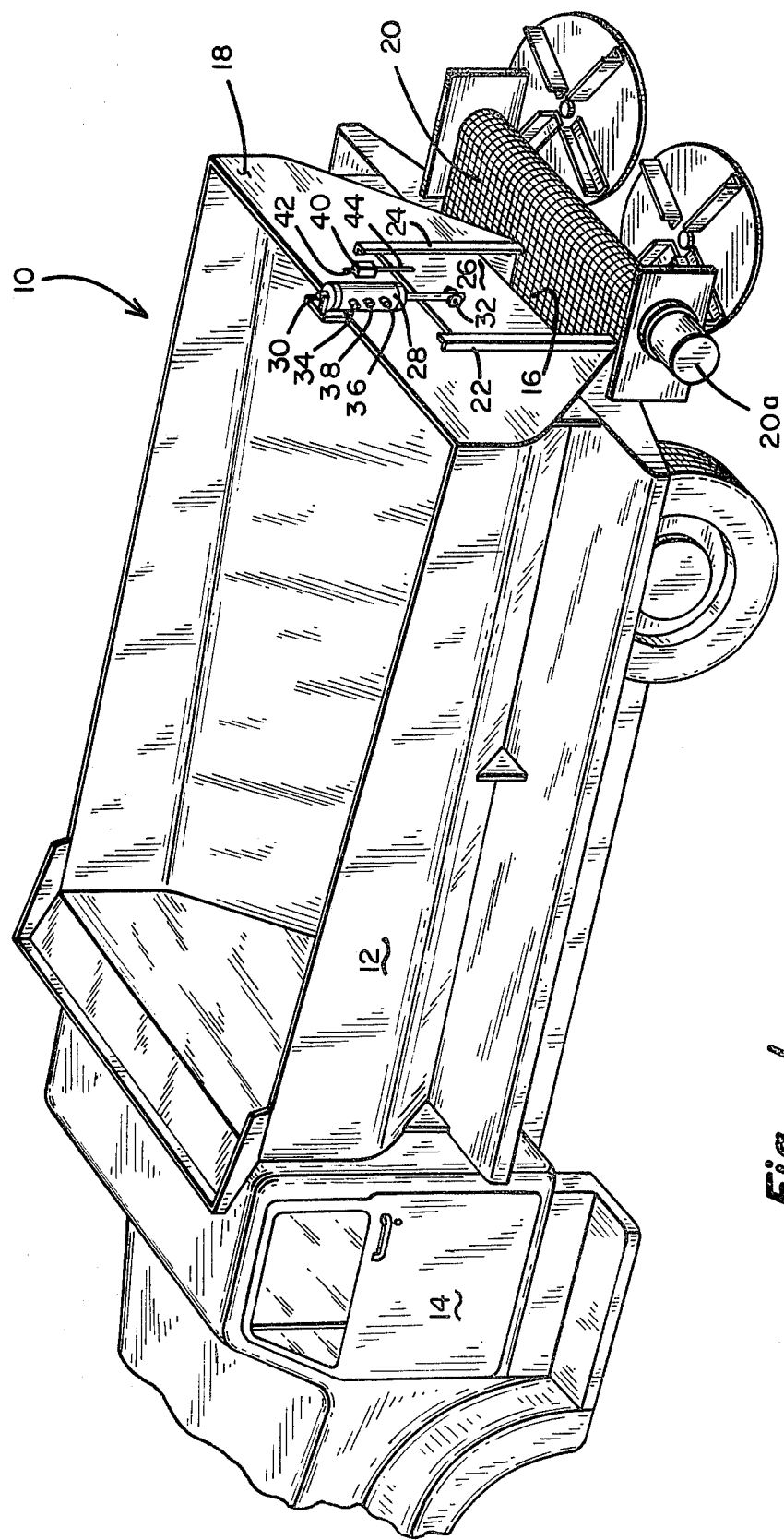
FIG. 1 illustrates a perspective view of a ground control system, the present invention, on a spreader.

FIG. 1, which illustrates a perspective view of components of a ground control system 10, the present invention on a spreader 12, shows the spreader 12 secured to a vehicle 14 such as a truck and being suitably secured thereto such as with nut-and-bolt assemblies. The spreader 12 on a vehicle 14 is known in the art as being utilized for the spreading of dry bulk materials such as fertilizer, salt or like material, and for the sake of brevity in the patent, is understood as consisting of the shell structure including an endless conveyor which runs the longitudinal length of the spreader. An exit port 16 is provided at the rear 18 of the spreader 12 and substantially adjacent to a rear end of a conveyor 20. A pair of opposing slotted tracks 22 and 24 running vertically and adjacent to either side of the exit port 16 support a reciprocal feedgate 26. A double acting hydraulic cylinder 28 connects between a fixed pivot point 30 on the rear 18 of the spreader 12 and a movable pivot point 32 on the reciprocal feedgate 26. Solenoid valve 34 controls the upward movement of the feedgate, solenoid valve 36 controls the downward movement of the feedgate, and solenoid valve 38 controls the magnitude of movement of the feedgate 26. A feedgate opening sensor 40 such as a variable resistor in this case connects between a fixed point 42 onto a movable bracket 44 for providing a closed loop feedback signal as to the condition of the feedgate by way of example and for purposes of illustration only in that other closed loop feedback signals can be provided and the disclosure of a reciprocating potentiometer arm is not to be construed as limiting the scope of the invention.

Figure 2:
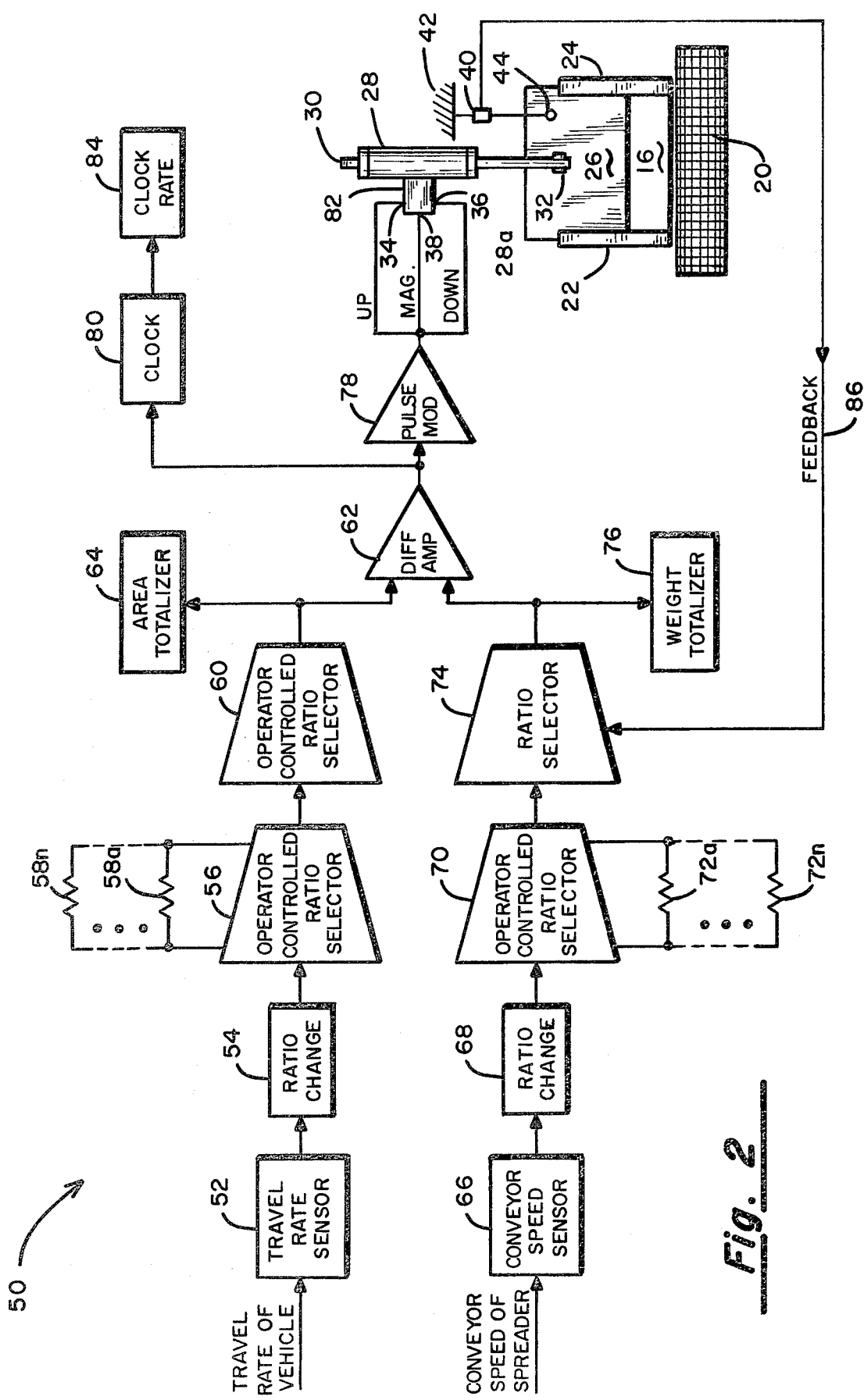
FIG. 2 illustrates a block diagram of the ground control system and electrical circuit.

FIG. 2, which illustrates an electrical circuit block diagram 50 of the ground control system 10 of the present invention, shows a travel rate sensor 52 and a conveyor rate sensor 54 sensing respectively the travel speed of the vehicle 14 and the conveyor speed of the conveyor 20, as now described in detail.

The travel rate sensor 52 can be connected to a suitable drive component or drive sensing component of the vehicle, such as the engine, the transmission, the wheel, or more preferably the speedometer driveline. The travel speed is sensed either as an analog signal or as a digital signal which is then converted with a digial to analog converter or as also referred to as a digital to voltage converter. The analog signal is appropriately calibrated taking into account differences in the speedometer drive, drive components of the vehicle, tire size, etc., for the particular vehicle being utilized and the travel calibration signal can be a one-time factory adjustment. This calibration is done either by fixed resistances or an operational amplifier 54 as required. An operational amplifier 56 connects in series with the previous amplifier 54 and provides adjustment to the signal ratio for the variable swath width which is adjusted by feedback resistors 58a through 58n. An additional operational amplifier or ratio amplifier 60 provides ratioing of the travel signal for the application rate of the material to be spread. A totalizer 64 provides an output signal of area totalizer for the area covered by the vehicle. The output of the application rate amplifier 60 inputs into one side of the differential amplifier 62.

The travel speed of the conveyor 20 is sensed with a sensor 66 digital encoded shaft which is subsequently converted to an analog signal by a D-A or D-V converter. An operational amplifier 68 or resistor network then ratios the signal for variances in the conveyor width, conveyor sprocket size, drive pulley, etc., which is usually considered a one-time factory adjustment requiring no further adjustment in the field. An operational amplifier 70 with feedback resistors 72a through 72n adjusts for density of the material to be spread. A serially connected operational amplifier 74 further ratios the conveyor signal as required and inputs the feedback signal from the feedgate opening potentiometer 40.

The differential amplifier 62 determines difference between the magnitude of the travel signal 52 and the conveyor signal 66, and controls the up/down direction of the feedgate 26 coupled to the double-acting hydraulic cylinder 28 in that when the travel signal is greater, the feedgate 26 opens up, and when the conveyor speed is slower, the feedgate 26 closes.

Pulse modulated amplifier 78 modulated by an adjustable clock 80 controls the pulse length of the servo drive signals to the double-acting hydraulic cylinder 28 in that long pulses drive the servo fast and short pulses drive the servo slow. The use of pulse modulation provides speed control, preventing overshooting and overcoming the inertia of the hydraulic cylinder. In effect, the pulse width changes the slew rate of the signal. The pulse modulated amplifier 78 outputs an up signal, a down signal, and a magnitude signal corresponding to the speed of driving of the hydraulic cylinder 28.

MODE OF OPERATION

Initial operation of the ground control system 10 of the present invention for a spreader 12 on a vehicle 14 requires presetting of ratios for predetermined constants. The presetting of ratios can be done either at the factory or in the field, and is considered a one-time adjustment. The ratio settings include adjustment for constants of tire size, vehicle size, drive components of the vehicle, transmission drive train, speedometer drive and can either be set with resistors or through adjustment of an operational amplifier 54. Further adjustments may have to be made for the transmission of the vehicle, the gear ratios, the rear axle ratio, and any other drive components. Once this adjustment is made, no further adjustments to the operational amplifier 54 are required. Likewise, ratio adjustments are made for the conveyor width, the drive pulley, conveyor sprocket size, etc., and no further adjustments are required to amplifier 68 once preset. The conveyor 20 is driven by a conveyor drive shaft not illustrated in the figure and which is connected to a gear case. A conveyor motor 20a, which is driven from a hydraulic motor connected to either the vehicle engine or transmission and is not illustrated in the figure, is a fixed displacement motor which will increase in speed as the vehicle increases speed, and connects to the gear case.

On utilizing the ground control system 10 with the spreader 12 on the vehicle 14, an operator needs initially to determine the variable swath which is determined by the rotating spreaders of the spreader which are usually hydraulically driven at a predetermined speed and dependent upon the material and to also adjust the application rate, which are preset on the operational amplifiers 56 and 60 respectively either through switchable resistor networks, variable potentiometer, or BCD switches depending upon the particular design of the system. These adjustments are dialed or switched in adjustments, and require no particular operator skill with the exception of the operator being able to read and dial as required. Likewise, an operator selects for the density of the material in a similar manner on the operational amplifier 70 by reading and dialing or switching in the appropriate numerals corresponding to the density of the material. The operator can also, depending upon the speed of travel, the terrain, and the type of material being spread, adjust the pulse rate 84 through a suitable switch to clock 80.

After setting the appropriate adjustments in the travel rate circuit and the conveyor speed circuit, the operator is prepared to drive the vehicle and apply the material. On starting the travel speed of the vehicle and actuating the ground control system, the feedgate 26 meters between an open and closed position for an application rate which is a function of the varying ratios of the travel speed to the conveyor speed as differentiated by the differential amplifier 62 and as pulse modulated by the pulse modulator 78 providing an up/down and magnitude control system to the double-acting hyraulic cylinder 28 which is coupled to feedgate 26. A closed loop feedback signal 86 connects from a potentiometer 40 to an operational amplifier 74 which further ratios the conveyor signal and inputs the feedback signal from the feedgate opening potentiometer 40. The pulse modulator 78 controls the length of the pulse to the double-acting hydraulic cylinder 28 providing optimum speed control and preventing overshooting. The variable slew rate of 78 overcomes the inertia of the hydraulic cylinder. The pulse rate is chosen at a predetermined optimum frequency yielding the most efficient control of the double-acting hydraulic cylinder 28 and is dependent upon the system parameters.

During the spreading process, the area totalizer 64 computes the lane, acres, or miles covered based on the travel rate sensor signal. The weight totalizer 76 computes the total weight of material spread based on the conveyor speed sensor speed. These readouts, which can be digital readouts, provide information as to the total area covered and the total weight spread. Circuitry can be provided to also turn off the ground control system 10 on reaching a predetermined total amount of weight of material applied or a predetermined total amount of area covered by the vehicle 14 spreadng material through the spreader 12 and thereby shut off the ground control system 10 on reaching these numbers. The area totalizer 64 and weight totalizer 76 can include ascending as well as descending registers for not only areas and weights covered, but also areas and weights remaining respectively.

The electrical circuitry provides for integration of the spreading rate through the travel rate in the top series connection of circuit elements and provides for integration of the density rate through the conveyor rate in the bottom series connection of circuit elements thereby providing for regulated metering of the material based on the ground speed of the vehicle.

The ground control system can also pertain to other over the ground vehicles such as construction equipment, agricultural equipment, or the like. The system can integrate the travel speed, a first distance versus time, as a function of a first variable, integrate a second distance versus time or like quantity which can or cannot be distance or time related as a function of a second variable and control a function of a third variable by a closed loop feedback signal. In the alternative, the control of the function of the third variable can a function of only the first or second variable. One particular example would be controlling the function of an element of a vehicle between the vehicle and the ground such as an element of construction or agricultural equipment. The function of the element could be height above the ground or depth in the ground for construction or agricultural equipment. The essence is sensing speed of a vehicle as a first quantity and one other operational second quantity, and controlling a third operational quantity through integration of the first two quantities, differentiation of the two signals, and controlling the third quantity through a closed loop feedback signal.

The ground control system could also pertain to liquid fertilizing equipment where the travel speed of the vehicle is sensed as a first quantity and boom pressure on the spray bar or bars as a second quantity, and controlling the fluid bypass to the liquid fertilizer tank as a function of vehicle speed to control the boom pressure. The boom pressure is most easily sensed at the orifice of the bypass valve and is responsible for controlling pressure on the boom. The flow of the bypass valve is also used to stir the contents of the tank. The pressure at the orifice of the bypass valve is substantially equal to the pressure on the boom and is maintained in the range of 10–40 psi. Instead of sensing conveyor speed, boom pressure is sensed, and instead of hydraulically controlling the feedgate, the bypass valve is hydraulically controlled through the closed loop feedback system. Likewise, conveyor width would correspond to spray nozzle area and density of material would correspond to concentration of material. The hydraulic cylinder would connect to the bypass valve thereby maintaining a predetermined boom pressure. The boom pressure can be preset on either the application rate or in the alternative, the ratio selector.

Various modifications can be made to the ground control system of the present invention without departing from the scope thereof. While the ground control system has been described by way of an electrical circuit, mechanical as well as hydraulic elements can be substituted for the respective electrical components to provide identical operation of a ground control system including the sensing of travel speed, the sensing of meter speed and adjusting the feedgate opening according to the differential between the travel speed and the metering speed with a closed loop feedback control signal to one of the speed circuits.

I claim:

1. Application rate control system for controlling opening of metering feedgate of a spreader with respect to vehicle travel speed and conveyor speed, said system comprising:

a. means for sensing travel speed of a vehicle, said means comprises a sensor connected to a gear train of said vehicle, means for ratioing said vehicle speed and connected to said travel speed sensing means, and means for incrementally selecting constants of swath width and application rate means for operationally amplifying a generated vehicle speed signal and connected to said ratio means;

b. means for sensing speed of a conveyor, said means comprises a sensor connected to a drive gear of said conveyor, means for ratioing width of said conveyor and connected to said conveyor speed sensing means, and means for incrementally selecting constant of density of material, means for operationally amplifying a generated conveyor speed signal and connected to said ratio means;

c. means for ratio selecting and connected to said constant selecting means;

d. means for differential amplifying output signals of said ratio selecting means and said constant selecting means;

e. means for sensing and controlling position of said metering feedgate comprising a double acting hydraulic servo control cylinder and a variable potentiometer for outputting a position control signal, said sensing and controlling means connected between said differential amplifier means and said ratio selecting means; and, f. means for pulse modulating an output signal from said differential amplifier means to said double acting servo control hydraulic cylinder whereby said sensing and controlling position means generates a closed loop feedback signal thereby providing for control of said metering feedgate with respect to said travel speed and said conveyor speed and said pulse modulation means controls positioning of said metering feedgate.

2. System of claim 1 wherein said selecting means comprises selectable feedback resistor means connected across each of said operational amplifiers.

* * * * *